(No Model.) 3 Sheets—Sheet 1.

J. F. W. AMENDE.
GRINDING MILL.

No. 561,252. Patented June 2, 1896.

Witnesses
H. van Oldenneel
M. Supple

Inventor
Johann Friedrich Wilhelm Amende

Attorneys (No Model.) 3 Sheets—Sheet 2.
J. F. W. AMENDE.
GRINDING MILL.
No. 561,252. Patented June 2, 1896.
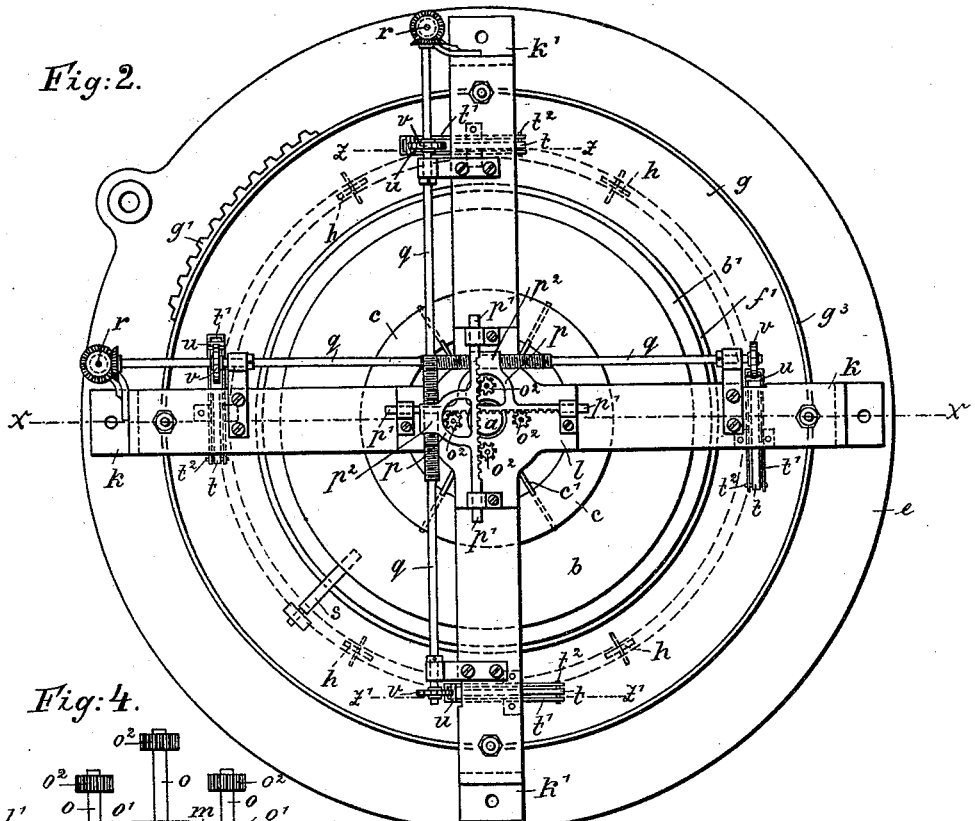
Fig. 2.
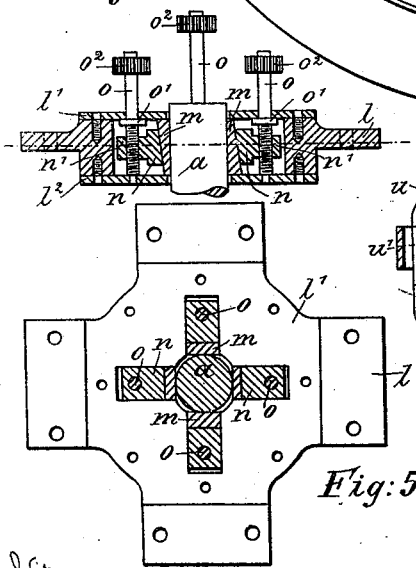
Fig. 4.
Fig. 5.
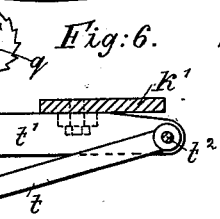
Fig. 6.
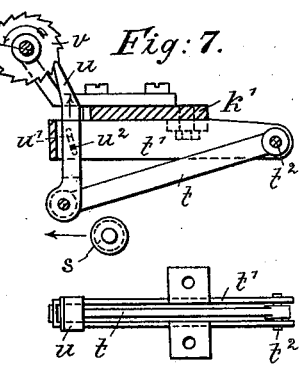
Fig. 7.
Fig. 8.
Witnesses
H. van Oldenneel
M. Supple
Inventor
Johann Friedrich Wilhelm Amende
by Richardson
Attorney (No Model.) J. F. W. AMENDE. 3 Sheets—Sheet 3.
GRINDING MILL.

No. 561,252. Patented June 2, 1896.

Witnesses
H. van Oldenneel
M. Supple

Inventor
Johann Friedrich Wilhelm Amende
by Richards & R
Attorneys

UNITED STATES PATENT OFFICE.

JOHANN FRIEDRICH WILHELM AMENDE, OF MALLISS, GERMANY, ASSIGNOR OF ONE-HALF TO FRITZ SCHWARTZ, OF DÖMITZ, GERMANY.

GRINDING-MILL.

SPECIFICATION forming part of Letters Patent No. 561,252, dated June 2, 1896.

Application filed August 20, 1895. Serial No. 559,951. (No model.)

*To all whom it may concern:*

Be it known that I, JOHANN FRIEDRICH WILHELM AMENDE, miller, a subject of the Emperor of Germany, and a resident of Malliss, near Dömitz, in the Empire of Germany, have invented new and useful Improvements in Grinding-Mills, of which the following is a full, clear, and exact description.

This invention relates to a grinding-mill with upper running-stone and vertical mill-spindle. This mill-spindle, passing through the whole mill and carrying the upper running-stone fixed to same by a conical rynd, is so mounted in bearings above the said running-stone and below the fixed stone that such spindle is kept in the horizontal position automatically by an arm on the running-stone striking a lever of adjusting devices. The stones are thus kept at a uniform distance apart, the frequent dressing of the stones is done away with, and the uneven running as well as the heating of the stones wholly avoided. The stones, therefore, are thus rendered far more effective. In thus maintaining the stones at a uniform distance apart the finer meal is properly acted upon and a uniform product thus obtained, such product being kept cool by a strong blast of air passing through the large eye of the bed-stone. Furthermore, a considerable saving in power is effected, and thus a far greater output is obtained.

A further improvement is that by my arrangement the stones may be very readily dressed, when required, by securing a suitable trimmer between the upper and lower stones.

I will now describe my invention with reference to the accompanying drawings, in which—

Figures 1, 3:
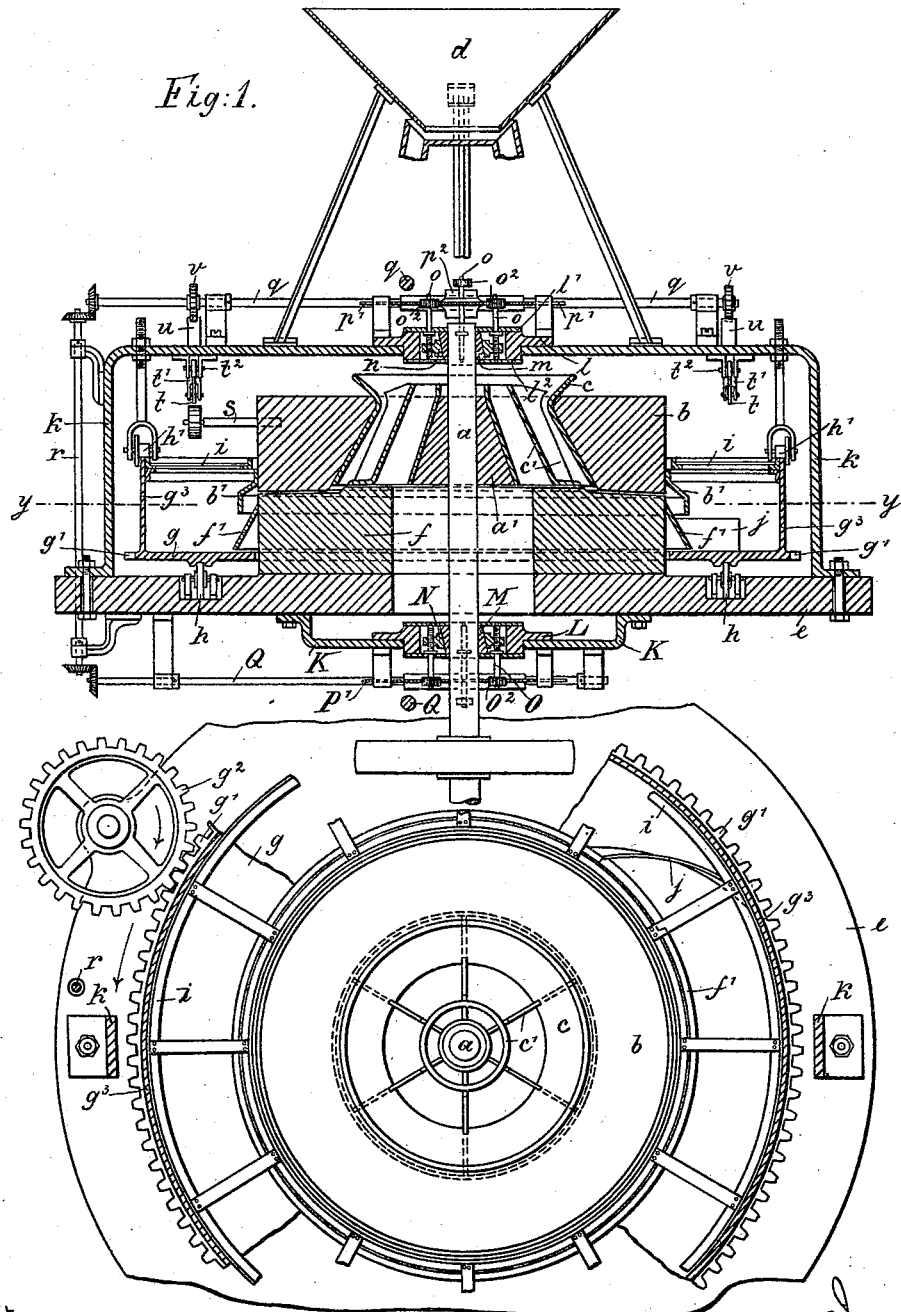
Figure 9:
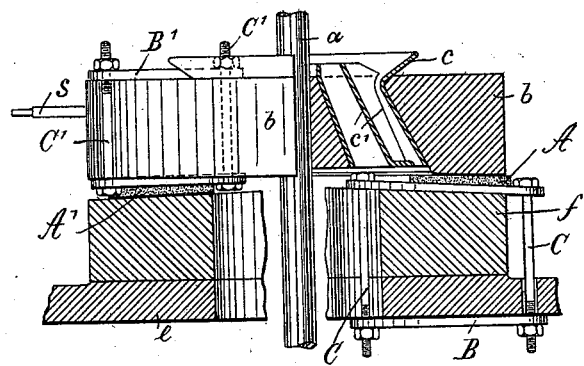
Figure 10:
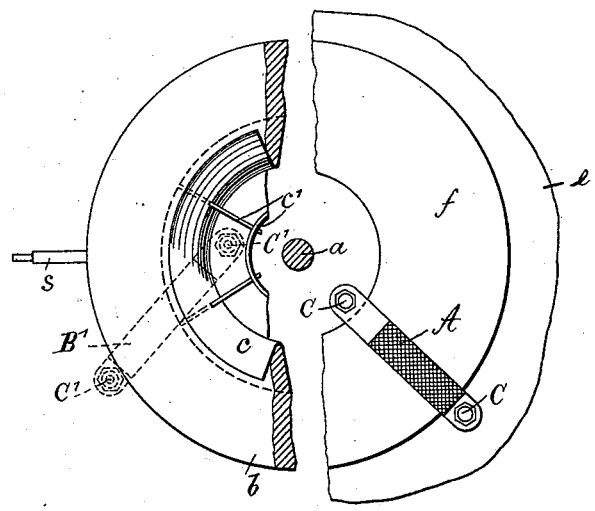

Figure 1 is a vertical section on line $x\,x$ of Fig. 2. Fig. 2 is a plan of the mill, and Fig. 3 a horizontal section on line $y\,y$ of Fig. 1. Figs. 4 and 5 show the adjustable bearing for the mill-spindle on an enlarged scale and in vertical and horizontal section, respectively. Figs. 6 and 7 are sections on lines $z\,z$ and $z'\,z'$, respectively, of Fig. 2. Fig. 8 is a plan of Fig. 7. Fig. 9 shows the method of securing the trimming instrument beneath the raised running-stone. Fig. 10 is a plan of same in part section.

The mill-spindle $a$, extending through the entire mill, carries the running-stone $b$ on the fixed conical rynd $a'$, which is provided with a hollow body $c$, having radial sectional and conical walls $c'$ for effecting a uniform feeding of the grain from the funnel $d$ and for allowing a proper supply of air to pass between the stones. The lower stone $f$, secured to the horizontal table $e$, has a large eye through which passes the mill-spindle $a$ and which also admits a strong current of air when the mill is running. On the lower stone $f$ is secured a conical ring $f'$, down which runs the meal, a ring $b'$ on the running-stone $b$ preventing the finer meal flying off. All the meal is thus delivered to the annular floor $g$, surrounding the lower stone $f$ and provided on its periphery with teeth engaging with the slowly-rotating toothed wheel $g^2$. This floor $g$ is guided by rollers $h$, mounted in the table $e$, and by rollers $h'$, mounted on adjustable holders and running on the rim-flange $g^3$ of the floor $g$.

The annular space between the stones and the rim-flange $g^3$ is covered by a frame $i$, over which canvas or the like is stretched, and thus the fine meal is prevented from flying off.

$j$ is a scraper secured to the lower stone, near the meal-outlet, through which the meal is thus uniformly forced.

In order to prevent the mill becoming hot and the stones getting dull, as also the meal becoming too hot, it is absolutely necessary that the upper running-stone is kept in the true horizontal position. To effect this, the mill-spindle is mounted above the running-stone and below the bottom stone between adjustable wedges, which wedges are acted upon through the medium of the running-stone until the mill-spindle regains its true vertical position. For this purpose standards $k\,k'$, crossing each other, are bolted to the table $e$, and thus support the bearings for the upper end of the mill-spindle $a$. Such bearing consists of a chamber $l$, closed by the upper and lower plates $l'\,l^2$, through whose center openings extends the end of the mill-spindle $a$. Readily-exchangeable wedges $m$, made of wood, metal, or the like, rest with their straight vertical sides against the mill-spindle, while the opposite oblique sides are acted upon by correspondingly-shaped chocks $n$, which may be moved up and down by means of screw-spindles $o$, provided with rings $o'$ for preventing vertical displacement and passing through correspondingly-screw-threaded projections $n'$ of the chocks $n$.

The spindles $o$ are rotated by the toothed wheels $o^2$, mounted on the ends of same and engaging with a rack $p'$, forming part of frame $p$. The frames $p$ carry socket portions $p^2$, which are threaded to receive and engage with the threaded portions of the spindles $q$, which are rotatably supported in the standards $k\ k'$. For each two opposite adjusting-wedges $m$ is provided a spindle $q$ for effecting the uniform movement of the correspondingly-shaped wedges, which thus keep the mill-spindle in the vertical position. When four wedges are used, the screw-spindles $q$ preferably cross each other at right angles, while the frame $p$ and rod $p'$ are above each other. The screw-spindles $o$ for the higher rack $p$, engaging with wheels $o^2$, are correspondingly longer than the other spindles, as shown in Figs. 1 and 4 of the drawings.

The arrangement of the second and lower bearing for the mill-spindle $a$ is exactly the same as the upper one. As will be seen in Fig. 1, the corresponding parts are represented by capital letters. The transmission of the motion of the spindles Q, operating the adjusting-wedges to the spindle $q$ of the upper bearing, is effected by bevel-wheels mounted at the ends of such spindles and communicating with each other by means of vertical shafts $r$, likewise provided with bevel-wheels.

In order to effect the automatic operation of the spindles $q$ Q, so as to cause the mill-spindle $a$ to maintain its vertical position, the upper running-stone $b$ is provided with a striker $s$, which comes in contact with a lever $t$ when the stone $b$ is not exactly horizontal.

As shown in Fig. 6, the lever $t$, pivoted to a frame $t'$, bolted underneath the standards $k\ k'$, is also pivoted to a pawl $u$, having oblique slot $u'$, in which engages the pin $u^2$ of frame $t'$. The pawl $u$ engages with ratchet-wheel $v$, keyed onto the spindle $q$. Hence when the arm $s$ strikes the lever $t$ on account of the upper stone $b$ not being horizontal the pawl $u$ rotates the wheel $v$ and the spindle $q$ in the directions shown by the arrow in Figs. 6 and 7. The teeth of the wheels $v$, mounted at each end of the spindles $q$, are oppositely arranged, and thus the latter are rotated in opposite directions, Figs. 6 and 7.

The arrangement of the striker $s$ on the upper running-stone $b$, as also of the lever $t$, is such that they do not come in contact with each other when the stone $b$ is perfectly horizontal; but immediately the stone loses that position—i.e., when the mill-spindle is not exactly vertical—the striker $s$ and lever $t$ come in contact with each other at that side of the stone which is raised. It will be evident that the striker $s$ and the lever $t$ may be provided with small wheels for reducing the effect of the contact.

The lower mill-spindle bearing may in some cases be dispensed with where the upper adjusting-bearing suffices. It is, however, essential that the mill-spindle pass through the whole mill. It has been found preferable to employ four adjusting-wedges, although it will be evident that the number and arrangement of same may be varied to suit certain cases or conditions without departing from the spirit of this invention.

Figs. 9 and 10 show the method of employing the stone-trimmer A, which is inserted between the upper and lower stones. To permit of the upper stone being raised sufficiently to admit the trimmer, the roller on the striker $s$ is removed, when the end of $s$, Fig. 9, comes in contact with the lever $t$ in the manner above described, and thus maintains the horizontal position of the mill-spindle.

As shown in Figs. 9 and 10, the trimmer A, of cast-steel or the like, is secured to the bedstone $f$ by means of two bolts C and the connecting part B, the one bolt passing along the outside of the stone $f$ and the other through the eye in same. The dressing or trimming face of the trimmer A is thus brought to bear on the rotating stone $b$. For trimming the lower stone $f$ a similar arrangement A' B' C' is secured to same, as shown at the left of Figs. 9 and 10. The parts $c\ c'$ are removed for admitting the bolts C' through the eye in the stone, or the bolts may be passed obliquely between such parts. Moreover, it will be evident that the parts $i$, $b'$, and $f'$, Fig. 1, must be removed before the trimmer can be attached.

It will also be evident that by means of such trimmer not only a true face is obtained, but that also the faces of the stones may be made to incline more or less, according to the nature of the material to be ground. For instance, in grinding rough material a broader radially-tapering opening near the eye may be formed. Furthermore, the trimmer may be set either radially or, for instance, as shown to the left of Fig. 10, while the size, shape, and the manner of preparing the trimming or dressing face of the trimmer (i. e., whether same consists of grooves, teeth-like projections, or is provided with a layer of grinding material) are unessential features.

Having now particularly described and ascertained the nature of my said invention, I declare that what I claim, and wish to secure by Letters Patent, is—

1. A grinding-mill, comprising the combination of an upper running-stone, mounted on rynd $a'$ and rotated by the vertical mill-spindle $a$; a striker $s$ secured to the running-stone $b$ and striking levers $t$ when the upper stones are not horizontal; spindles $q$ operated by pawls $u$ of levers $t$; racks $p$ actuated by the spindles $q$ and engaging with the wheels $o^2$ acting on the chocks and wedges $n$, $m$ substantially as described and shown in the accompanying drawings.

2. In a grinding-mill, the combination with the framework and stationary stone, the vertical rotating spindle, the rotating stone carried thereby, the striking-levers supported from the framework, the striker-arm carried by the revolving stone and arranged to contact with the striking-levers when the revolving stone departs from its horizontal position, and connections from the striker-arm to the spindle whereby the contact of the striker-arm with said levers shifts the spindle laterally to correct the position of the movable stone, substantially as described.

3. In combination with the framework and stationary lower stone, the vertical spindle, the upper stone carried thereby, the wedges supported from the framework and bearing against the spindle, the striking-levers also supported from the framework and having connections for operating upon said wedges, and the striker-arm carried on the upper stone and arranged to contact with the striking-levers when the stone departs from a horizontal position, substantially as described.

4. In combination with the framework and lower stone, the vertical spindle, the wedges bearing against the spindle, the transverse spindles $q$ having connections for operating upon said wedges to shift the spindle laterally, the independent striker-arms having operating connections with each end of the spindles $q$, and a striker-arm carried by the rotary stone, substantially as described.

In witness whereof I have hereunto signed my name in the presence of two subscribing witnesses.

JOHANN FRIEDRICH WILHELM AMENDE.

Witnesses:
F. KOLLM,
F. SCHWARTZ.